United States Patent [19]

Dittman et al.

[11] 3,883,407
[45] May 13, 1975

[54] PRODUCTION OF 2,2,2-TRIFLUOROACETYL CHLORIDE

[75] Inventors: Albert L. Dittman, Allendale, N.J.

[73] Assignee: Halocarbon Products Corporation, Hackensack, N.J.

[22] Filed: Apr. 20, 1973

[21] Appl. No.: 353,025

[52] U.S. Cl. ............................................ 204/158 R
[51] Int. Cl. .................................................. B01j 1/10
[58] Field of Search ............................... 204/158 R

[56] References Cited
UNITED STATES PATENTS

| | | | |
|---|---|---|---|
| 2,736,695 | 2/1956 | Calfee et al. | 204/158 R |
| 3,151,051 | 9/1964 | Braid et al. | 204/158 R |

OTHER PUBLICATIONS
Journal Chem. Soc. (1959), pp. 387–395.

Primary Examiner—Howard S. Williams
Attorney, Agent, or Firm—Burgess, Dinklage & Sprung

[57] ABSTRACT

The process for the production of trifluoroacetyl chloride which comprises reacting 1,1-dichloro-2,2,2-trifluoroethane containing less than about 0.1% of water by weight with oxygen in the gas phase at a temperature up to about 250°C in the presence of ultraviolet radiation. Desirably the reaction is conducted continuously with an average residence time of about 0.1 to 1 hour.

5 Claims, No Drawings

PRODUCTION OF 2,2,2-TRIFLUOROACETYL CHLORIDE

The present invention relates to the production of trifluoroacetyl chloride.

Trifluoroacetyl chloride is produced commercially and can be converted to the corresponding acids, esters, amides and other known derivatives of known utility.

Haszeldine et al. in J. C. S. 1959 P. 387 disclose the preparation of trifluoroacetyl chloride by the photochemical oxidation of various chlorofluoroethanes. As starting materials there are named trichlorotrifluoroethane, dichlorotrifluoroethane and chlorotrifluoroethane. In addition to oxygen, chlorine and bromine were sometimes present and the reaction time in different runs ranged from 5 minutes to more than 1 week. Water was sometimes present but, even if not added, apparently some was produced in the reaction since in many instances trifluoroacetic acid was produced in significant amount along with the trifluoroacetyl chloride. In addition, the space-time yields of the desired product were so low as not to be suitable for commercial practice. Finally, the full process details were not set forth.

It is accordingly an object of the present invention to provide a process for the production of trifluoroacetyl chloride from halogenated hydrocarbons in high conversion and high yield.

It is a further object of the invention to provide a process of the nature described which is simple, highly efficient and capable of being carried out continuously.

These and other objects and advantages are realized in accordance with the present invention pursuant to which substantially anhydrous 1,1-dichloro-2,2,2-trifluoroethane, i.e. containing less than about 0.1% of water by weight, is reacted with oxygen in the gas phase at a temperature up to about 250°C in the presence of actinic, e.g. u.v., radiation. Desirably the reactants are continuously supplied to a reaction vessel and product is continuously removed therefrom, the average residence time in said vessel ranging from about 0.1 to 1 hour.

The 1,1-dichloro-2,2,2-trifluoroethane may be substantially 100% pure or it may contain small amounts of other halogenated hydrocarbons which are carried through the process unchanged or which even may undergo reaction. Thus, commercial 1,1-dichloro-2,2,2-trifluoroethane may contain a few percent of 1,1,2-trichloro-1,2,2-trifluoroethane and this generally goes through the process unchanged. The 1,1-dichloro-2,2,2-trifluoroethane should be substantially anhydrous, i.e. contain less than about 0.1% of water by weight, so as to prevent significant hydrolysis of the resulting acid chloride to acid.

The oxygen may be diluted with other non-reactive gases such as nitrogen, carbon dioxide or the like. Theoretically it is consumed in one-half the molar amount of the 1,1-dichloro-2,2,2-trifluoroethane and desirably it is employed in about 50 to 200% of the stoichiometric amount required, preferably at least about 100%.

The temperature of the reaction may vary widely, so long as the 1,1-dichloro-2,2,2-trifluoroethane is in the gaseous state. The temperature may be as high as 250°C or higher but preferably ranges from about 50° to 150°C, especially 75° to 125°C. The pressure is obviously related to the temperature and is generally above about 50 psig, e.g. above about 75 psig, provided it is not so high that a liquid phase is present. Liquid phase reaction is unsuitable commercially since some HF is apparently produced which attacks the glass or quartz light wells. In addition, liquid phase reaction apparently results in production of substantial amounts of by-products since the total yield of acid chloride and acid is far less than theoretical.

The reaction proceeds relatively rapidly and even when carried out continuously is complete at an average residence time of about 0.1 to 1 hour, preferably about 0.15 to 0.5 hours.

The reaction may be conducted in the presence of chlorine gas which apparently speeds it up somewhat but also somewhat increases the quantity of side products produced. Thus, whether or not it is present is a matter of choice.

The actinic radiation is supplied by ultraviolet lamps and the reaction is generally proportional to the intensity of radiation. The precise wattage will depend upon the size and shape of the vessel and the location of the lamps. If the reaction velocity is too low the intensity, i.e. number of lamps and/or wattage, may be raised but it obviously should not reach such a level that the reaction is violent or run-away. Thus, illumination may be interrupted periodically to control the reaction although it is preferably continuous.

The reaction vessel is generally a jacketed pressure vessel although an elongated tubular reactor could also be used. The vessel when used is preferably provided with mixing means such as a stirrer. Since the reaction is exothermic cooling water is generally circulated through the jacket but the wall temperature, as contrasted with the gas temperature inside the vessel, should not be so low as to produce condensation on the wall.

Following the reaction vessel the products are introduced into a first still, under pressure, to separate the HCl which is produced, mole-for-mole, with trifluoroacetyl chloride. The HCl which boils at −80°C comes off overhead and is condensed and partially refluxed to help separate it from trifluoroacetyl chloride. Any unconsumed oxygen also comes off overhead in this still. Since its boiling point is −183°C, its pressure serves to reduce the temperature at which the HCl will condense for refluxing and thus increases the refrigeration requirement. It is for this reason that large excesses of oxygen are not especially desirable.

The distillation residue then passes to a second still in which the trifluoroacetyl chloride comes off overhead and the small residue contains unreacted starting material plus trace amounts of by-products and trifluoroacetic acid.

The invention will be further described in the following illustrative examples wherein all parts are by weight unless otherwise expressed.

EXAMPLE 1

1,1-Dichloro-2,2,2-trifluoroethane containing 2% by weight of 1,1,2-trichloro-1,2,2-trifluoroethane as an impurity is evaporated and fed at the rate of 100 pounds per hour into a stirred 1,000 gallon vessel along with 12 pounds per hour of oxygen. The vessel is provided with quartz light wells into which there are fitted four 2,000 watt medium pressure ultraviolet lamps.

The vessel is jacketed and cooled with water to maintain a wall temperature of 40°C while the temperature inside the vessel is 105°C. The pressure within the vessel is 120 psig. A gas mixture is withdrawn from the vessel at the same mass rate it is fed, the average residence time being 0.2 hour. The gas mixture is passed under pressure into a first distillation column whose base is at a temperature of about 48°C. HCl formed in the reaction comes off overhead with the excess oxygen and a condenser at −36°C condenses the HCl, a portion of which is recycled as reflux to ensure that the acid chloride produced in the reaction does not come off at this stage. This is withdrawn 23 pounds per hour of HCl. The distillation residue from the first column is then fed to a second column wherein 82 pounds per hour of trifluoroacetyl chloride comes off overhead at a pressure of 110 psig (boiling point 42°C) while there is produced 5 pounds per hour of a residue comprising by weight about 60% of 1,1-dichloro-2,2,2-trifluoroethane, all the 1,1,2-trichloro-1,2,2-trifluoroethane originally introduced, a small amount of 1,1,1-trichloro-2,2,2-trifluoroethane formed as a by-product in the reaction, a trace of trifluoroacetic acid and some other fluorinated-chlorinated organics. Thus, about 95% of the 1,1-dichloror-2,2,2-trifluoroethane feed is consumed and is converted in about 99% yield to trifluoroacetyl chloride.

EXAMPLE 2

Into a 10 gallon Monel jacketed stirred autoclave there is charged 715 grams of 1,1-dichloro-2,2,2-trifluoroethane. The vessel is heated to 60°C and oxygen containing 5% of chlorine by volume is introduced to give a pot pressure of 40 psig. Two 400 watt ultraviolet lamps in the vessel are turned on and after 5 minutes the temperature rises to 97°C and the pressure to 66 psig at which time the lamps are extinguished. After 15 minutes the pot cools to 61°C and the pressure falls to 57 psig. The lights are turned on for another 5 minutes whereupon the temperature rises to 92°C and the pressure to 71.5 psig. The lights are turned off for 18 minutes and the temperature drops to 60°C and the pressure to 58 psig. The lights are turned on once again for 5 minutes, the temperature rising to 78°C and the pressure to 70.5 psig. After 17 minutes with the lights off, the temperature falls to 58°C and the presence to 60.5 psig. A final 5 minutes with the lamps on produces a temperature of 70°C and a pressure of 69.5 psig whereupon the reaction is discontinued. The product is analyzed and includes 3.7% of unreacted starting material, less than 1% of other materials and trifluoroacetyl chloride in an amount corresponding to 95% yield.

EXAMPLE 3

In a comparison run involving liquid phase reaction, into the same vessel as in Example 2 there are charged 65 pounds of 1,1-dichloro-2,2,2-trichloroethane. The vessel is heated to 72°C and oxygen containing 5% of chlorine by volume is introduced over a period of 2 hours to raise the pot pressure from 40 psig to 80 psig. The overwhelming proportion of the material remains in the liquid phase. The lamps are left on and after 6 hours the pot pressure falls to 70 psig. The liquid contains some trifluoroacetyl chloride corresponding to a conversion of about 2.5%. Based on time of illumination, the yield in pounds per hour is only about 8% that of Example 2. The product also contains 10% as much 1,1,1-dichloro-2,2,2-trifluoroethane as of trifluoroacetyl chloride. Upon emptying the reaction contents through a glass tube severe etching is observed indicating a significant amount of HF is present.

EXAMPLE 4

In the same vessel as in Example 2 233 grams of starting material is charged. Using a 400 watt lamp for 20 minutes a yield of 91.5% trifluoroacetyl chloride is produced. This shows that the yield is not affected by using either continuous or intermittent illumination.

EXAMPLE 5

1,1-dichloro-2,2,2-trifluoroethane (5.0 millimoles) and oxygen (22.6 millimoles) are condensed and sealed in a 394 ml glass tube. After warming to ambient conditions the tube containing liquid and vapor is exposed to a 275 watt GE sunlamp for 4 hours. The tube is cooled in liquid nitrogen and then opened and connected to a vacuum system. Upon separation, there is obtained a yield of 9.2% of trifluoroacetic acid, 73.5% of trifluoroacetyl chloride and 87% of HCl, all based on the theoretical amounts obtainable.

It will be appreciated that the instant specification and examples are set forth by way of illustration and not limitation, and that various modifications and changes may be made without departing from the spirit and scope of the present invention.

What is claimed is:

1. The process for the production of trifluoroacetylchloride which comprises reacting gaseous 1,1-dichloro-2,2,2-trifluoroethane containing less than about 0.1% of water by weight with a gas consisting essentially of oxygen at a temperature up to about 250°C in the presence of ultraviolet radiation thereby to produce trifluoroacetyl chloride containing less than about 5% of trifluoroacetic acid.

2. The process of claim 1 wherein dichlorotrifluoroethane and oxygen gases are continuously supplied to a reaction vessel and product is continuously removed therefrom, the average residence time in said vessel ranging from about 0.1 to 1 hour.

3. The process of claim 1 wherein the oxygen is present in about 50 to 200% of the stoichiometric amount.

4. The process of claim 1 wherein the temperature is about 50° to 150°C and the presence is at least about 50 psig.

5. The process of claim 1 wherein dichlorotrifluoroethane gas and about 90 to 135% of the stoichiometric amount of oxygen are continuously supplied to a reaction vessel and product is continuously removed therefrom, the average residence time in said vessel ranging from about 0.15 to 0.5 hours, the temperature in said vessel ranging from about 75° to 125°C and the pressure is at least about 75 psig, the dichlorotrifluoroethane containing less than about 0.01% of water by weight thereby to produce trifluoroacetyl chloride containing less than about 1% of trifluoroacetic acid.

* * * * *